Figure 3:
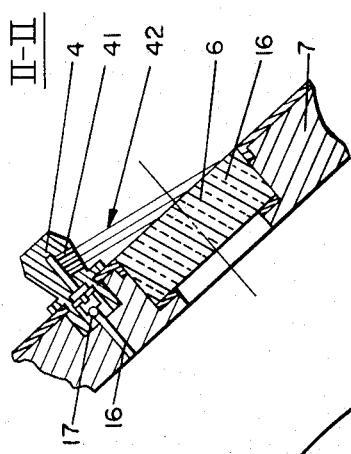

United States Patent [19]
Champeau

[11] 3,848,961
[45] Nov. 19, 1974

[54] OBSERVATION DEVICE

[76] Inventor: Andre Champeau, 7, Rue Puvis de Chavannes 75, Paris, France

[22] Filed: Sept. 22, 1972

[21] Appl. No.: 291,321

[30] Foreign Application Priority Data
Sept. 28, 1971  France .............................. 71.34873
Aug. 30, 1972  France .............................. 72.30726

[52] U.S. Cl. ................................. 350/63, 350/319
[51] Int. Cl. ...................... G02b 7/00, G02b 23/16
[58] Field of Search ............................. 350/61–65, 350/319

[56] References Cited
UNITED STATES PATENTS

| | | | |
|---|---|---|---|
| 1,222,156 | 4/1917 | Steinmetz ............................ | 350/63 |
| 3,114,790 | 12/1963 | Hanks ................................... | 350/63 |
| 3,321,265 | 5/1967 | Clave et al ........................... | 350/63 |
| 3,375,802 | 4/1968 | Lazarre ................................ | 350/319 X |
| 3,475,859 | 11/1969 | Pirlet .................................... | 350/61 X |
| 3,515,465 | 6/1970 | Jones ................................... | 350/319 |
| 3,552,821 | 1/1971 | Cross ................................... | 350/63 |
| 3,578,407 | 5/1971 | Arnold et al ........................ | 350/319 |

Primary Examiner—David H. Rubin
Attorney, Agent, or Firm—Cameron, Kerkam, Sutton, Stowell & Stowell

[57] ABSTRACT

An observation device for mounting on a wall of a treatment apparatus for observing the interior of the apparatus which device has a casing, an eye-piece, a lighting device, an optical device and an optical element for positioning between the interior of the chamber and the eye-piece and lighting device, respectively, the optical device and optical element being mounted in the connector plate for connecting the casing to the apparatus and cleaning means being provided to clean the surfaces of the optical device and the optical element which will be directed to the interior of the apparatus.

2 Claims, 3 Drawing Figures

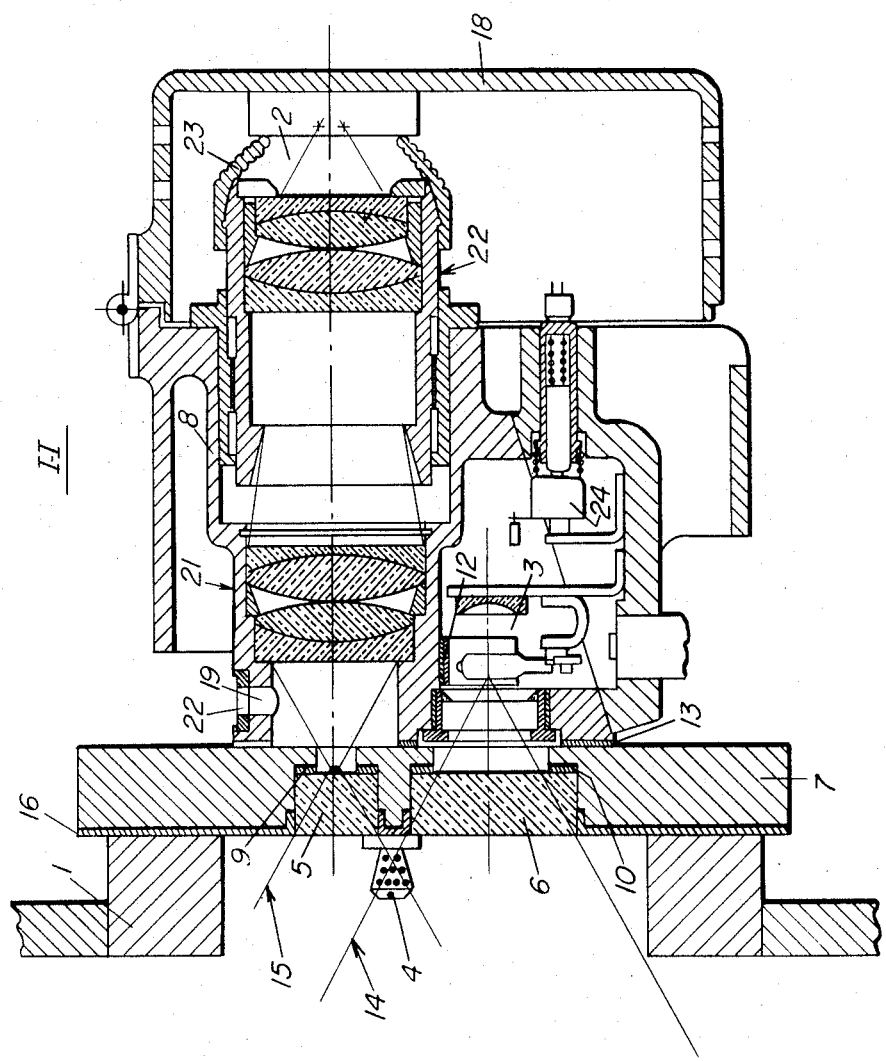

OBSERVATION DEVICE

The present invention relates to a viewing device for use in a physical or chemical treatment apparatus.

The viewer of the invention is designed for use preferably in pressure apparatus (reactors, autoclaves, etc.) or in apparatus treating toxic or dangerous products, for example, in the nuclear industries. It can relate to apparatus for the physical or chemical treatment of chemical compounds, foodstuffs, pharmaceuticals . . . It allows direct or remote viewing, by means of a television camera or photographic or cinematographic recordings.

A physical or chemical phenomemon which is taking place in a chamber can be studied by means of apparatus for measurement of physical or chemical characteristics or else by a visual, photographic, or cinematographic optical method. This method of study or optical observation of the interior of the apparatus in which a physical or chemical process is taking place is very advantageous in certain applications.

Optical observation, in chambers which must not communicate with the outside, is also effected through tight windows or viewers having a transparent sheet for observation. Viewers for apparatus containing pressurised or explosive media must be adapted to conditions of pressure and temperature and be the object of considerable security measures. Each viewer must undergo hydraulic tests so as to guarantee complete safety in use. To provide a suitable angle of vision, the transparent plate of the viewer generally has a relatively large surface area. Because of this, the risks of breakage are increased. Personnel must, as much as possible, be protected against the effects of breakage during use either by grids or covers. Viewing is sometimes carried out by means of a mirror. Mounting and clamping of the transparent plate must be effected with care to avoid the production of parasitic stresses. Finally, viewers must retain their transparency. To avoid too frequent exchange or dismounting and mounting with the attendant risks of imperfect mounting or faulty clamping, it has been recommended that a device should be provided to wash the internal surface of the viewer which is not accessible in use. For vision to be possible in the sealed chamber, the viewer with its transparent plate, mounted on a flange, is associated with a separate lighting device mounted on another flange. This solution, which in particular necessitates the construction of two flanges, is onerous.

In accordance with the present invention there is provided an observation device designed to be attached to a treatment apparatus which devices includes:
a casing formed of at least one part which is resistant to the conditions of pressure and temperature,
an optical eye-piece permitting observation in a wide field, mounted in the casing,
an optical element for protection of the viewer, of small diameter, mounted towards the outside, in the fixing plate of the casing on the apparatus, the eye-piece permitting observation through this optical element,
an organ for lighting the inside of the chamber mounted in the casing,
an optical element for protection of the lighting organ mounted towards the outside in the said plate,
means for cleaning the optical protection elements of the eye-piece and the lighting organ.

Figure 2:
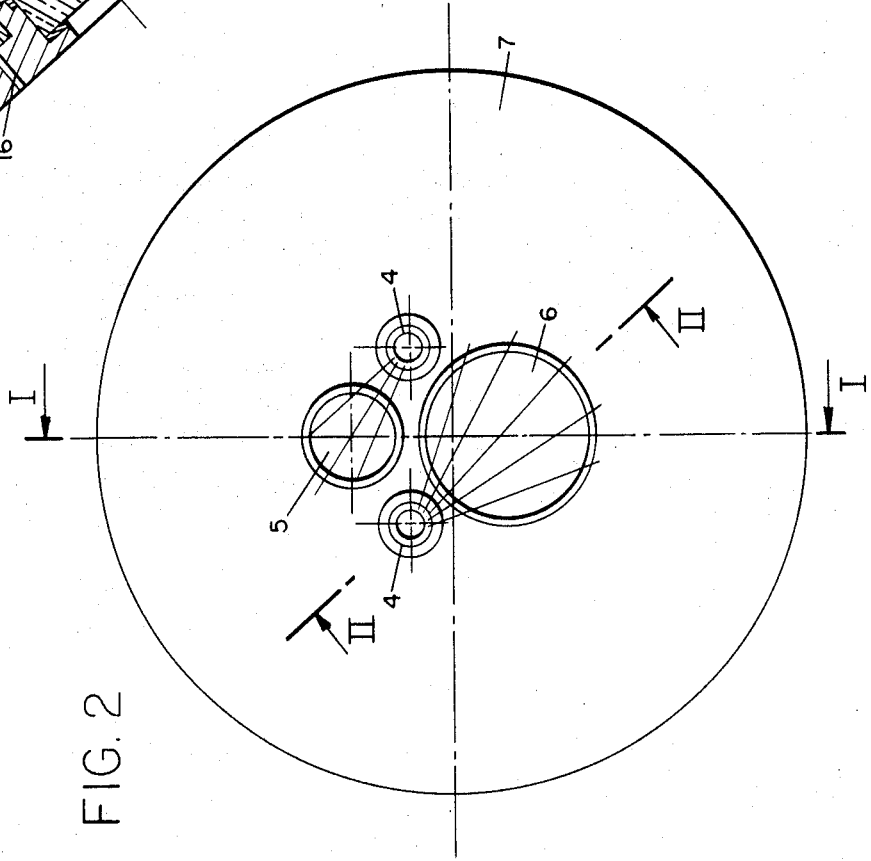

Other features and advantages of the present invention will become apparent from the following description of one embodiment given by way of example only, illustrated by the attached drawing in which:

FIG. 1 is a view of the optical viewer of the invention along section I—I of FIG. 2 passing through the axis of the viewer and the lighting device, FIG. 2 is a side view of this optical viewer, FIG. 3 is a partial section along II—II of FIG. 2.

As shown in FIGS. 1 and 2, the viewer mounted on a physical or chemical treatment apparatus 1 comprises an optical eye-piece 2, a lighting device 3 for the inside of the apparatus, plates with parallel surfaces 5 and 6 respectively protecting eye-piece 2 and fireproof lighting device 3, and nozzles 4 for cleaning the outer surfaces of plates 5 and 6. Casing 8, in which eye-piece 2 and lighting device 3 are mounted, is rigidly connected to an attachment plate 7, of sufficient thickness, designed for attachment to apparatus 1. Protective plate 5, associated with eye-piece 2, which bears on plate 7, through a ring 9 of plastics material, is provided with a small diameter, the thickness being calculated to resist the internal pressure of apparatus 1, with the necessary safety coefficient. Eye-piece 2 may be of remote measurement type to determine the level of the liquid in apparatus 1. It includes appropriate lenses forming the objective 21 and the ocular 22 which is terminated by a hood 23. They permit vision through plate 5 in a sufficient field. Plate 6, which protects lighting unit 3 and bears against plate 7 through a ring 10 of plastics material, is calculated to resist the internal pressure, with a lower safety coefficient than is necessary for plate 5, safety on breakage of plate 6 being ensured by casing 8. For this reason, plate 6 is provided with a greater diameter than plate 5. The diameter of plate 6 and the position of lamp 3 determine a lit zone 14 which cuts across the field of vision 15 of the eye-piece for correct vision. The optic of eye-piece 2, which must not be subjected to excessively high temperatures, is thermally insulated from the inside of chamber 1 by a thermally insulating joint such as 13, mounted between attachment plate 7 and casing 8. The optic is similarly thermally insulated from the lighting device by an insulating layer 12. The attachment plate is coated on the apparatus side with a coating 16 of anti-adherent material of the teflon type, preventing deposits and also insulating the viewer from the apparatus. The safety of the observer is increased by a conduit 19 closed by a blow-out disc 25 which is able to communicate the chamber formed between sheet 5 and the first lens of objective 21 with the outside.

As shown in FIGS. 2 and 3, nozzles 4 each have a plurality of orifices 41 which, supplied with pressurised cleaning fluid, determine the spraying of jets 42 the distribution of which enables the external surfaces of plates 5 and 6 to be cleaned. The supply of cleaning fluid through channels such as 26 is controlled by non-return valves such as 27, which only allow passage of the cleaning fluid, preventing passage of the pressurised fluid contained in apparatus 1. Alternate nozzles 4 can spray a cleaning fluid and the others a drying fluid or each of the nozzles can spray successively onto the sheets a cleaning fluid and a drying fluid. These nozzles are made of an anti-adherent material such as Teflon, preventing any deposit and the blockage of orifices 41.

The protection of the user is increased during non-observation periods by a pivoting, outer cap 18. Pivoting of cap 18 determines the manipulation of contact 24 which actuates the operation of the lighting device 3.

The above described provides an observation device having an optical element which has high resistance and, as a result, ensures efficient protection of the observer. Vision is made possible by a combination of means comprising optical means and cleaning means which ensure the necessary cleanlines of the optical elements subjected to soiling by the medium contained in the apparatus. Furthermore the optical device is thermally insulated from the interior of the chamber, which avoids any action of heat on the optic and lighting is controlled automatically during the observation periods.

Of course, the invention is not rigidly limited only to the embodiments described as an example, but also covers other embodiments which only differ from them in detail.

What we claim is:

1. An observation device for high pressure and temperature treatment apparatus comprising a casing for said apparatus resistant to high pressure and temperature conditions, an opening in said casing, an optical eye-piece including an objective lens for observation within said casing in a wide field, mounted on said casing adjacent said opening, an optical element for protection of said eye-piece, of small diameter with respect to said opening, an attachment plate mounting said element and closing said opening, said eye-piece providing observation within said casing through said optical element, a device for lighting the interior of said casing mounted on said plate, a second optical element protecting said device mounted in said plate between said lighting device and the interior of said casing, and spray nozzle means of anti-adherent material located on said plate adjacent said optical elements for cleaning the surface of said optical elements exposed to the interior of said casing.

2. A device according to claim 1, said eye-piece including a body, a conduit in said body, a blow-out disc closing said conduit, said conduit connecting a space between said attachment plate and said objective lens of said eye-piece to the outside.

* * * * *